US011948535B1

(12) United States Patent
Li et al.

(10) Patent No.: US 11,948,535 B1
(45) Date of Patent: Apr. 2, 2024

(54) ELECTRONIC DEVICE AND OPERATING METHOD THEREOF

(71) Applicant: Novatek Microelectronics Corp., Hsinchu (TW)

(72) Inventors: Cheng Hsien Li, Hsinchu (TW); Yuan-Po Cheng, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 17/963,997

(22) Filed: Oct. 11, 2022

(51) Int. Cl.
*G09G 5/12* (2006.01)
*G09G 5/18* (2006.01)

(52) U.S. Cl.
CPC ................. *G09G 5/12* (2013.01); *G09G 5/18* (2013.01)

(58) Field of Classification Search
CPC ................................... G09G 5/12; G09G 5/18
See application file for complete search history.

(56) References Cited

U.S. PATENT DOCUMENTS 9,514,511 B2 12/2016 Lee et al.
2013/0057763 A1* 3/2013 Cha .......................... G09G 5/12 348/554
2015/0015591 A1* 1/2015 Oh ............................ G06F 3/14 345/519
2015/0029201 A1 1/2015 Cha et al.
2015/0130824 A1 5/2015 Lee et al.
2020/0066226 A1 2/2020 Han et al.
2022/0051631 A1 2/2022 Cheon et al.

FOREIGN PATENT DOCUMENTS

CN 104637466 5/2015
TW 655623 4/2019
WO 2021164004 8/2021

OTHER PUBLICATIONS

"Office Action of Taiwan Counterpart Application", dated Jan. 15, 2024, p. 1-p. 7.

* cited by examiner

*Primary Examiner* — Brent D Castiaux
(74) *Attorney, Agent, or Firm* — JCIPRNET

(57) ABSTRACT

An electronic device includes an application processor and a display control circuit. The display control circuit may output a (tearing effect) TE signal to the application processor and receive an image frame from the application processor. A data processing circuit of the display control circuit generates a notification signal when the data processing circuit is ready to receive the image frame from the application processor. The timing controller generates the TE signal having a first frequency during a period from a first time point when the notification signal is received to a second time point when the application processor starts transmitting the image frame to the data processing circuit. The first frequency is greater than a reference frequency based on an output frame rate of the display control circuit.

11 Claims, 4 Drawing Sheets

ELECTRONIC DEVICE AND OPERATING METHOD THEREOF

BACKGROUND

Technical Field

The disclosure generally relates to an electronic device, and more particularly to an electronic device and an operating method that are capable of shortening a latency of data transmission and avoiding frame dropping and frame skipping issues on the electronic device.

Description of Related Art

A display device is widely used in many electronic apparatuses such as mobile phones, tablets, computers, and the like. One of display problems occurring on the display panel of the display device is known as "tearing effect", in which data of two or more image frames are displayed at the same time on the display panel. To avoid the tearing effect, the display panel may emit a tearing effect (TE) signal having a fixed frequency to an application processor to indicate an appropriate timing for transmission of an image frame to the display panel. The frequency of the TE signal is usually related to an output frame rate of the display device. The application processor only transmits the image frame to the display panel when the TE signal from the display panel is received. As such, even if the image frame is ready to be transmitted by the application processor, the application processor still needs to wait until the TE signal having the fixed frequency is arrived to trigger the transmission of the image frame, resulting in a long latency of data transmission.

In addition, if the application processor has completely processed more than one image frames while the TE signal has not arrived, a frame skipping issue and/or a frame dropping issues may occur, resulting in a degradation in performance of the display device. For example, the frame skipping and the frame dropping issues may occur when jitter occurs in the image frame.

FIG. 1 illustrates a timing diagram of signals in an existed display device. The horizontal axis of the timing diagram illustrates time, and the vertical axis of the timing diagram illustrates signal occurrence in the existed display device. The existed display device (not shown) may include a display panel (not shown) and an application processor (not shown), and the application processor includes a digital processing unit (DPU) and a display serial interface (DSI). As shown in FIG. 1, the TE signal TE_0 has the fixed frequency, and TE pulses of the TE signal TE_0 is periodically emitted every cycle Tcyc. The DPU may output image frames A, B, C, D and E to the DSI, and the DSI is configured to transmit these image frames to the display panel upon an arrival of a TE pulse of the TE signal TE_0. For example, the image frame A is transmitted from the DSI to the display panel when the DSI receives a TE pulse Pa of the TE signal TE_0 at t01, and the image frame B is transmitted from the DSI to the display panel when the DSI receives a TE pulse Pb of the TE signal TE_0 at t02. Due to the jitter occurring between the image frame B and the image frame C, the DPU may take long time to output the image frame C. Even if the DPU outputs the image frame C to the DSI at t03, the DSI needs to wait until a TE pulse Pc of the TE signal TE_0 arrives at t04 to transmit the image frame C to the display panel. The waiting time from t03 to t04 results in a long latency of the data transmission from the application processor to the display panel. In addition, as a result of the long latency of the data transmission of the image frame C, the DPU may output the image frame D to the DSI before the DSI completely transmits the image frame C to the display panel. Accordingly, the image frame D may be skipped by the DSI, causing the frame skipping and the frame dropping issues on the display device. The image frame E may be transmitted from the DSI to the display panel when the DSI receives a TE pulse Pe of the TE signal TE_0 at t05.

Since a demand for high quality display panel is grown recently, it is desired to have a creative design of an electronic device for display control that is capable of shortening the transmission latency and preventing frame dropping and frame skipping issues on display panel of the electronic device.

Nothing herein should be construed as an admission of knowledge in the prior art of any portion of the present disclosure.

SUMMARY

An electronic device and an operating method thereof that are capable of shortening the transmission latency and preventing frame dropping and frame skipping issues are introduced.

In some embodiments, the electronic device includes an application processor and a display control circuit. The application processor is configured to output an image frame according to a tearing effect (TE) signal. The display control circuit is configured to output the TE signal to the application processor and receive the image frame from the application processor. The display control circuit includes a data processing circuit and a timing controller. The data processing circuit is configured to generate a notification signal when the data processing circuit is ready to receive the image frame from the application processor. The timing controller is configured to receive the notification signal from the data processing circuit, and generate the TE signal having a first frequency during a period from a first time point when the notification signal is received to a second time point when the application processor starts transmitting the image frame to the data processing circuit. The first frequency is greater than a reference frequency based on an output frame rate of the display control circuit.

In some embodiments, the operating method of an electronic device includes steps of generating, by a data processing circuit of the display control circuit, a notification signal when the data processing circuit is ready to receive an image frame from the application processor; receiving, by a timing controller of the display control circuit, the notification signal from the data processing circuit; generating, by the timing controller of the display control circuit, a TE signal having a first frequency during a period from a first time point to a second time point; and transmitting, by the application processor, the image frame to the data processing circuit according to the TE signal, wherein the notification signal is received by the timing controller at the first time point, the image frame is started transmitting to the data processing circuit at the second time point, and the first frequency of the TE signal is greater than a reference frequency based on an output frame rate of the display control circuit.

In some embodiments, a display control circuit is configured to output the tearing effect (TE) signal to an application processor and receive the image from the application processor. The display control circuit includes a data processing circuit and a timing controller. The data processing circuit is configured to generate a notification signal when the data processing circuit is ready to receive the image frame from the application processor. The timing controller is configured to receive the notification signal from the data processing circuit, and generate the TE signal having a first frequency during a period from a first time point when the notification signal is received to a second time point when the application processor starts transmitting the image frame to the data processing circuit, wherein the first frequency is greater than a reference frequency based on an output frame rate of the display control circuit.

Based on the above embodiments, the timing controller may generate a TE signal with variable frequency, so as to adaptively control a data transmission from the application processor to the display control circuit. The timing controller may receive a notification signal indicating that the data processing circuit of the display control circuit is ready to receive image frame from the application processor. The timing controller may generate a TE signal having a high frequency during the period from a first time point to a second time point, in which the first time point is when the notification signal is received, and the second time point is when the application processor starts transmitting the image frame to the data processing circuit. In this way, the application processor may quickly transmit the image frame to the data processing circuit, a latency of data transmission is reduced, and frame dropping and frame skipping issues on the electronic device is prevented. In addition, the proposed technique in the disclosure may be applicable for existed application processor without a need to modify the existed application processor.

To make the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

It is to be understood that other embodiments may be utilized and structural changes may be made without departing from the scope of the present disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
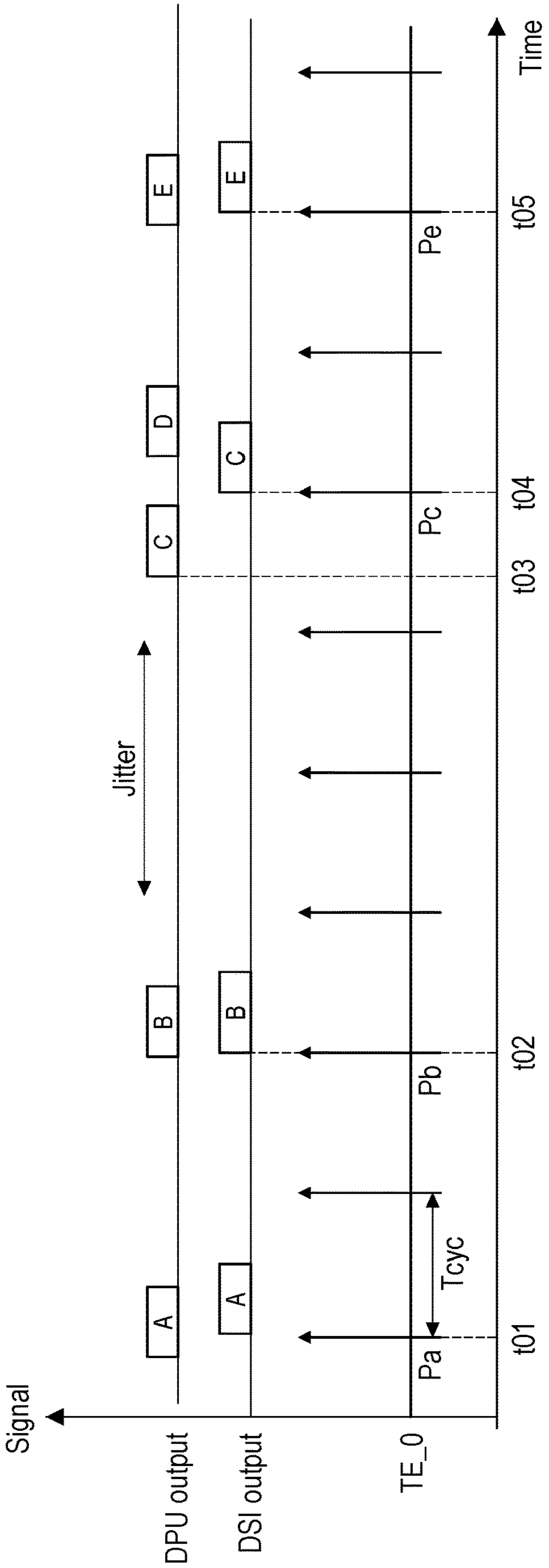
FIG. 1 (PRIOR ART)
FIG. 1 is a timing diagram of signals in an existed display device.
Figure 2:
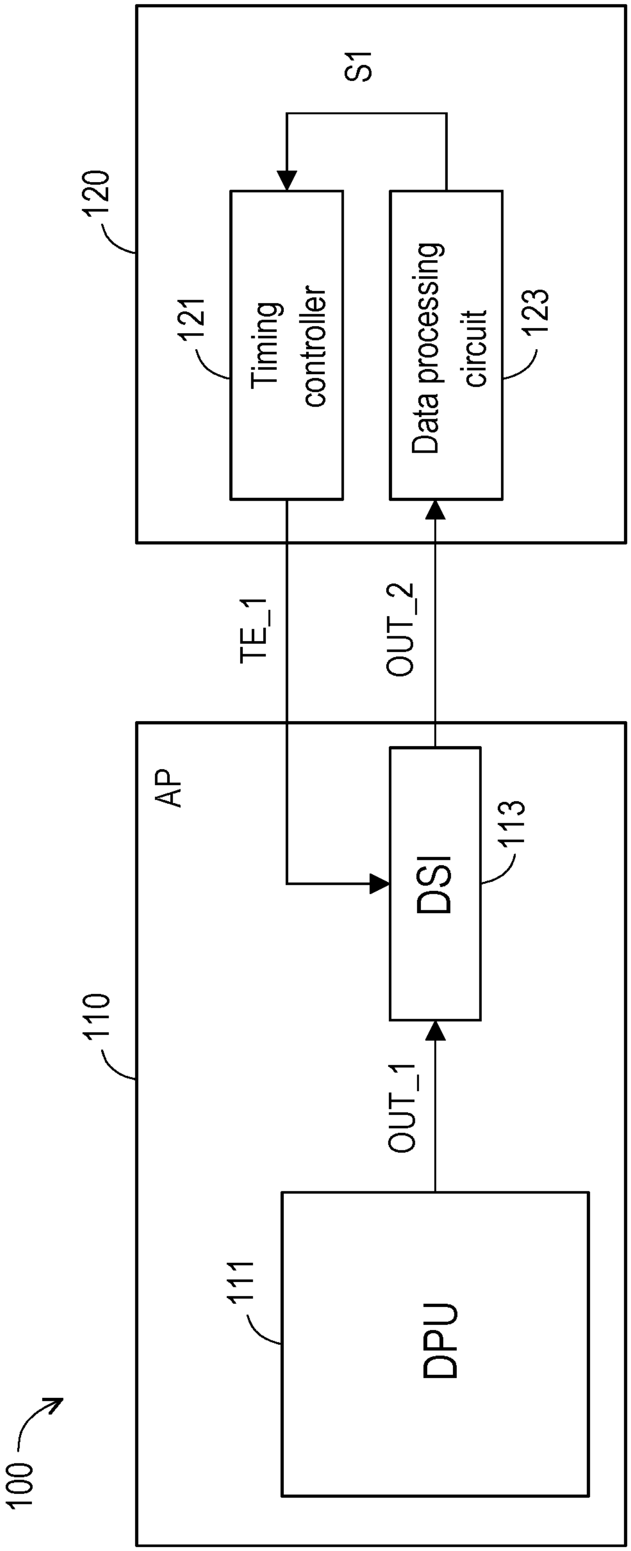
FIG. 2 is a schematic diagram of an electronic device in accordance with some embodiments.

FIG. 2 illustrates a schematic diagram of an electronic device 100 including an application processor (AP) 110 and a display control circuit 120 in accordance with some embodiments. The AP 110 may include a digital processing unit (DPU) 111 and a display serial interface (DSI) 113. The DPU 111 may include a plurality of logic circuits that are configured to perform at least one processing on image frames that are inputted to the DPU 111. In some embodiments, the DPU 111 may receive the image frames from a camera (not shown) that is coupled to the AP 110, but the disclosure is not limited thereto. The image frames may be inputted to the DPU 111 from other devices. After the DPU 111 finishes the at least one processing on image frame, the DPU 111 may output the image frames as an output signal OUT_1 to the DSI 113.

The DSI 113 is a high-speed communication interface that allows the AP 110 to communicate with the display control circuit 120. The DSI 113 may include a buffer circuit (not shown) that is configured temporarily store the image frame received from the DPU 111. The DSI 113 may further receive a tearing effect (TE) signal TE_1 from the display control circuit 120, and the DSI 113 is configured to output the image frame stored in the DSI 113 to the display control circuit 120 according to the TE signal TE_1. In some embodiments, the TE signal TE_1 includes a plurality of TE pulses that are transmitted to the DSI 113 when the display control circuit 120 is ready to receive the image frame from the DSI 113. The DSI 113 is configured to output an output signal OUT_2 including the image frame to the display control circuit 120 when receiving a TE pulse of the TE signal TE_1 from the display control circuit 120. In some embodiments, the output signal OUT_2 of the DSI 113 is a serial output signal that is transmitted to the display control circuit 120 through a serial bus connected between the AP 110 and the display control circuit 120. The display control circuit 120 may be a display control circuit (or a display IC) that is configured to control an operation of the electronic device 100, but the disclosure is not limited thereto. The display control circuit 120 may be a display panel, an image processing circuit, an image receiving apparatus, or any other suitable devices.

The display control circuit 120 may include a timing controller 121 and a data processing circuit 123, in which the timing controller 121 is electrically coupled to the data processing circuit 123. In some embodiments, the timing controller 121 is coupled to an input terminal of the DSI 113, and the data processing circuit 123 is coupled to an output terminal of the DSI 113. The data processing circuit 123 is configured to receive the image frame in the output signal OUT_2 from the DSI 113, and the data processing circuit 123 is configured to perform at least one processing operation on the received image frame to generate processed image frame. The disclosure does not intend to limit the at least one processing operation performed by the data processing circuit 123 on the image frame. When the data processing circuit 123 performs the at least one processing operation on the image frame, the data processing circuit 123 is in a busy state and is not ready to receive new image frame from the DSI 113. When the data processing circuit 123 finishes the at least one processing operation on the image frame, the data processing circuit 123 is in a ready state and is ready to receive the new image frame from the DSI 113. When the data processing circuit 123 is ready to receive the new image frame from the DSI 113, the data processing circuit 123 may send a notification signal S1 to the timing controller 121.

The timing controller 121 may generate the TE signal TE_1 according to the notification signal S1. When the timing controller 121 receives the notification signal S1 from the data processing circuit 123, the timing controller 121 may generate the TE signal TE_1 having a first frequency (also referred to as a high frequency), and the timing controller 121 may transmit the generated TE signal TE_1 having the first frequency to the DSI 113. In some embodiments, the first frequency of the TE signal TE_1 is determined according to a capability of the AP 110 (i.e., the highest frequency that the AP 110 can process). In some embodiments, the first frequency of TE signal TE_1 is close to an upper bound of an allowable range that is given to eliminate a problem in existing solutions. The existing solutions have a TE frequency depending on an output frame rate (e.g., 60 Hz or 120 Hz) without considering a collaboration with the application processor. Since the first frequency of TE signal TE_1 is determined according to the capability of the AP 110, the TE signal with the first frequency may be applied for a wide range of APs with a wide range of operating frequencies. The disclosure does not intend to limit the first frequency of the TE signal TE_1 to any specific frequency, and the first frequency of the TE signal TE_1 may be determined according to design requirements of the electronic device 100.

In some embodiments, the timing controller 121 transmits the TE signal TE_1 having the first frequency to the DSI 113 during a period from a first time point when the notification signal S1 is received to a second time point when the DSI 113 starts transmitting the image frame to the data processing circuit 123. In other words, the timing controller 121 transmits the TE signal TE_1 having the first frequency to the DSI 113 when the notification signal S1 indicates that the data processing circuit 123 is ready to receive the new data from the DSI 113. In some embodiments, the TE signal TE_1 may include a plurality of TE pulses which are periodically transmitted to the DSI 113 in the first frequency.

In some embodiments, a frequency of the TE signal TE_1 is variable over time according to a state (i.e., the busy state or a ready state) of the data processing circuit 123. In some embodiments, the TE signal TE_1 may include a plurality of TE pulses being outputted in the first frequency during the period from the first time point to the second time point, and the TE signal TE_1 does not include any TE pulse outside the period from the first time point to the second time point. The first time point may be the time point when the notification signal S1 is received by the timing controller 121, and the second time point may be the time point when the DSI 113 starts transmitting the image frame to the data processing circuit 123. Since the timing controller 121 transmits the TE signal TE_1 with the high frequency (i.e., the first frequency) to the DSI 113 when the data processing circuit 123 is ready to receive the image frame from the DSI 113, the DSI 113 may quickly transmit the image frame to the data processing circuit 123. As a result, a latency of data transmission from the AP 110 to the display control circuit 120 is reduced, and the frame dropping and frame skipping issues are prevented.

Figure 3:
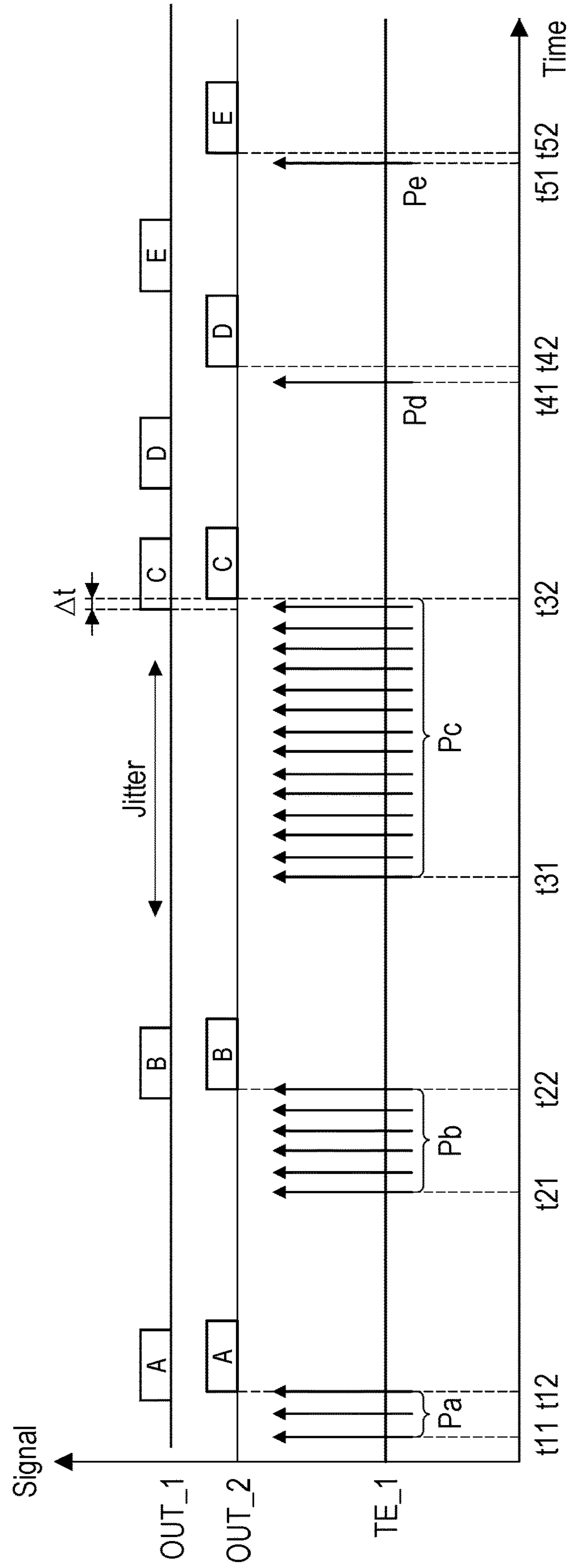
FIG. 3 is a timing diagram of signals in an electronic device in accordance with some embodiments.

FIG. 3 illustrates a timing diagram of output signals OUT_1, OUT_2 and the TE signal TE_1 in an electronic device (i.e., the electronic device 100 in FIG. 2) in accordance with some embodiments. Referring to FIG. 2 and FIG. 3, the output signal OUT_1 is outputted by the DPU 111, the output signal OUT_2 is outputted by the DSI 113, and the TE signal TE_1 is outputted by the timing controller 121. The DPU 111 may transmit the output signal OUT_1 including data of image frames A, B, C, D and E to the DSI 113. The DSI 113 may transmit the output signal OUT_2 including data of the image frames A, B, C, D and E to the data processing circuit 123 according to the TE signal TE_1.

In some embodiments, when the timing controller 121 receives the notification signal S1 indicating that the data processing circuit 123 is ready to receive the image frame A, the timing controller 121 starts transmitting TE pulses Pa of the TE signal TE_1 to the DSI 113 at t11. The TE pulses Pa of the TE signal TE_1 are transmitted to DSI 113 in the first frequency until the DSI 113 starts transmitting the image frame A to the data processing circuit 123 at t12. In other words, the timing controller 121 transmits the TE pulses Pa of the TE signal TE_1 in the first frequency during the period from t11 to t12. When the timing controller 121 receives the notification signal S1 indicating that the data processing circuit 123 is ready to receive the image frame B, the timing controller 121 transmits the TE pulses Pb of the TE signal TE_1 in the first frequency during the period from t21 to t22.

When the timing controller 121 receives the notification signal S1 indicating that the data processing circuit 123 is ready to receive the image frame C, the timing controller 121 starts transmitting the TE pulses Pc of the TE signal TE_1 to the DSI 113 at t31. The TE pulses Pc of the TE signal TE_1 are transmitted to DSI 113 in the first frequency during the period from t31 to t32. When jitter occurs in an image frame, the DPU 111 takes a long time to process the image frame. As shown in FIG. 3, the DPU 111 takes a long time to process the image frame C due to jitter occurring on the image frame C. As such, the period from t31 to t32 is longer than the periods from t11 to t12 and the period from t21 to t22. Since the TE pulses Pc of the TE signal TE_1 are transmitted to the DSI 113 in the high frequency (i.e., the first frequency), the time interval between consecutive TE pulses are short. As such, the DSI 113 may quickly transmit the image frame C to the data processing circuit 123 right after the DSI 113 receives the image frame C from the DPU 111. As a result, a latency Δt from a time point when the DPU 111 starts transmitting the image frame (i.e., image frame C) to a time point when the DSI 113 starts transmitting the image frame to the data processing circuit 123 is reduced.

When the timing controller 121 receives the notification signal S1 indicating that the data processing circuit 123 is ready to receive the image frame D, the timing controller 121 transmits the TE pulses Pd of the TE signal TE_1 in the first frequency during the period from t41 to t42. When the timing controller 121 receives the notification signal S1 indicating that the data processing circuit 123 is ready to receive the image frame E, the timing controller 121 transmits the TE pulses Pe of the TE signal TE_1 in the first frequency during the period from t51 to t52.

Referring to FIG. 2 and FIG. 3, the timing controller 121 does not transmit the TE pulses of the TE signal in a fixed frequency. Instead, the timing controller 121 transmits the TE pulses in a variable frequency based on an availability of the data processing circuit 123. When the data processing circuit 123 is ready to receive data from the DSI 113, the timing controller 121 generates and transmit the TE pulses in a relatively high frequency to the DSI 113, thus shorting the latency of data transmission between the AP 110 and the display control circuit 120, and preventing the frame dropping and frame skipping issues. When the data processing circuit 123 is not ready to receive data from the DSI 113, the timing controller 121 may stop generating and transmitting the TE pulses to the DSI 113.

Figure 4:
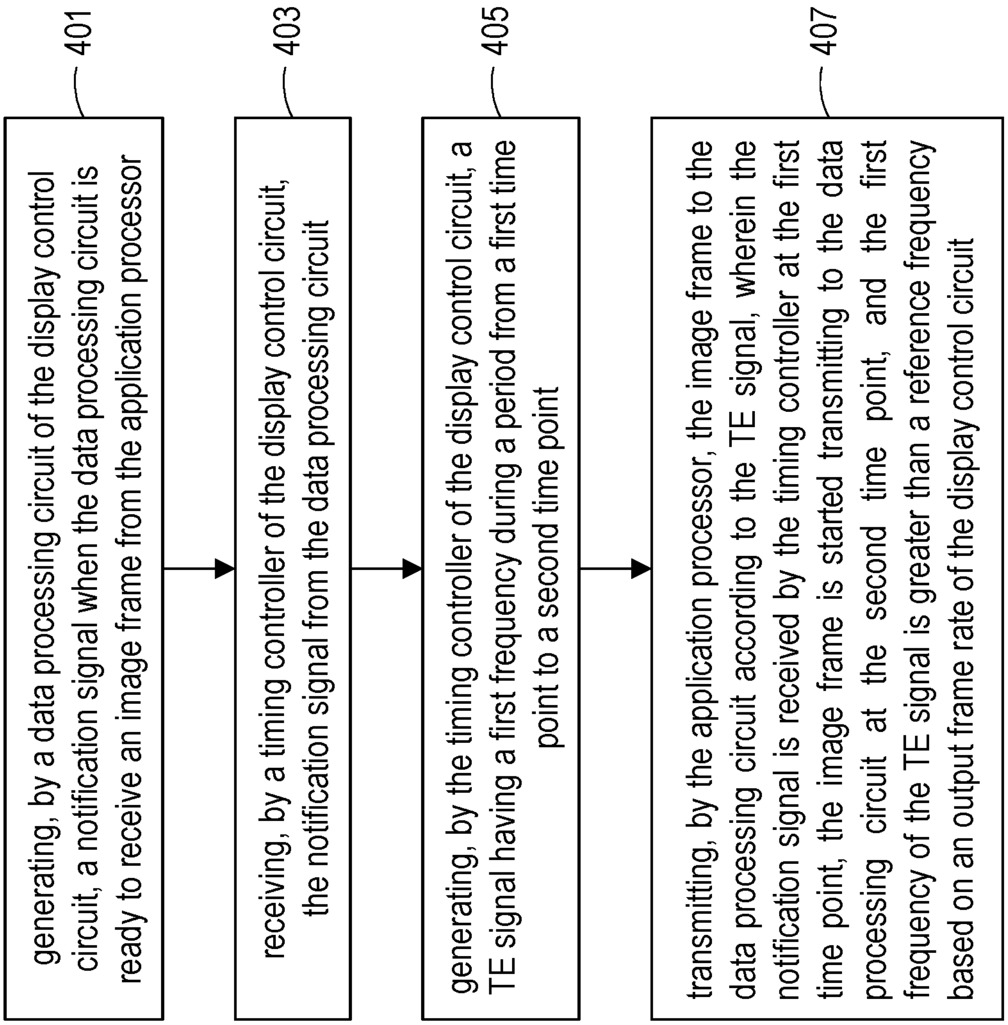
FIG. 4 is a flowchart diagram of an operating method of an electronic device in accordance with some embodiments.

FIG. 4 illustrates a flowchart diagram of an operating method of an electronic device (i.e., the electronic device 100 in FIG. 2) in accordance with some embodiments. The electronic device may include an application processor and a display control circuit. In block 401, a notification signal is generated by a data processing circuit of the display control circuit when the data processing circuit is ready to receive data from the application processor. In block 403, the notification signal is received by a timing controller of the display control circuit. In block 405, a TE signal having a first frequency is generated by the timing controller of the display control circuit during a period from a first time point to a second time point. In block 407, the image frame is transmitted by the application processor to the data processing circuit according to the TE signal. The notification signal is received by the timing controller at the first time point, the image frame is started transmitting to the data processing circuit at the second time point. In some embodiments, a frequency of the TE signal is variable, and the first frequency of the TE signal is greater than a reference frequency of the display control circuit.

In view of the foregoing embodiments, an electronic device includes an application processor and a display control circuit, and the display control circuit includes a timing controller and a data processing circuit. The timing controller may generate a TE signal with variable frequency, so as to adaptively control a data transmission from the application processor to the display control circuit. The data processing circuit of the display control circuit may output a notification signal to a timing controller of the display control circuit when the data processing circuit is ready to receive an image frame from the application processor. The timing controller may generate a TE signal having a high frequency during the period from the first time point when the notification signal is received to the second time point when the application processor starts transmitting the image frame to the data processing circuit. Since the application processor transmits the image frame data processing circuit according to the TE signal having the high frequency, the application processor may quickly transmit the image frame to the data processing circuit. In this way, a latency of data transmission is reduced, and frame dropping and frame skipping issues on the electronic device is prevented. Furthermore, the effect of shortening the latency of data transmission and preventing the frame dropping and frame skipping issues may be achieved based on the control of the timing controller without any modification to the application processor. As such, the technique of the disclosure may be applicable for existed application processor.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An electronic device for display control, the electronic device comprising:
- an application processor, configured to output an image frame according to a tearing effect (TE) signal;
- a display control circuit, coupled to the application processor, configured to output the TE signal to the application processor and receive the image frame from the application processor, wherein the display control circuit comprises:
  - a data processing circuit, configured to generate a notification signal when the data processing circuit is ready to receive the image frame from the application processor; and
  - a timing controller, configured to receive the notification signal from the data processing circuit, and generate the TE signal having a first frequency during a period from a first time point when the notification signal is received to a second time point when the application processor starts transmitting the image frame to the data processing circuit, wherein the first frequency is greater than a reference frequency based on an output frame rate of the display control circuit.

2. The electronic device of claim 1, wherein
- the TE signal comprises a plurality of TE pulses being outputted in the first frequency during the period from the first time point when the notification signal is received to the second time point when the application processor starts transmitting the image frame to the data processing circuit.

3. The electronic device of claim 1, wherein the application processor comprises:
- a digital processing unit, configured to generate the image frame to be outputted to the display control circuit; and
- a display serial interface, coupled to the digital processing unit and the timing controller, configured to receive the image frame from the digital processing unit and the TE signal from the timing controller, and output the image frame to the display control circuit according to the TE signal.

4. The electronic device of claim 1, wherein the first frequency is determined according to a capability of the application processor.

5. An operating method of an electronic device comprising an application processor and a display control circuit, the operating method comprising:
- generating, by a data processing circuit of the display control circuit, a notification signal when the data processing circuit is ready to receive an image frame from the application processor;
- receiving, by a timing controller of the display control circuit, the notification signal from the data processing circuit;
- generating, by the timing controller of the display control circuit, a TE signal having a first frequency during a period from a first time point to a second time point; and
- transmitting, by the application processor, the image frame to the data processing circuit according to the TE signal,
- wherein the notification signal is received by the timing controller at the first time point, the image frame is started transmitting to the data processing circuit at the second time point, and the first frequency of the TE signal is greater than a reference frequency based on an output frame rate of the display control circuit.

6. The operating method of claim 5, wherein
- the TE signal comprises a plurality of TE pulses being outputted in the first frequency during the period from the first time point when the notification signal is received to the second time point when the application processor starts transmitting the image frame to the data processing circuit.

7. The operating method of claim 5, further comprising:

generating, by a digital processing unit of the application processor, the image frame to be outputted to the display control circuit;

receiving, by a display serial interface of the application processor, the image frame from the digital processing unit and the TE signal from the timing controller; and outputting, by the display serial interface of the application processor, the image frame to the display control circuit according to the TE signal.

8. The operating method of claim 5, wherein the first frequency of the TE signal is determined according to a capability of the application processor.

9. A display control circuit, configured to output a tearing effect (TE) signal to an application processor and receive an image frame from the application processor, the display control circuit comprising:

a data processing circuit, configured to generate a notification signal when the data processing circuit is ready to receive the image frame from the application processor; and a timing controller, configured to receive the notification signal from the data processing circuit, and generate the TE signal having a first frequency during a period from a first time point when the notification signal is received to a second time point when the application processor starts transmitting the image frame to the data processing circuit, wherein the first frequency is greater than a reference frequency based on an output frame rate of the display control circuit.

10. The display control circuit of claim 9, wherein the TE signal comprises a plurality of TE pulses being outputted in the first frequency during the period from the first time point when the notification signal is received to the second time point when the application processor starts transmitting the image frame to the data processing circuit.

11. The display control circuit of claim 9, wherein the first frequency is determined according to a capability of the application processor.

* * * * *